Patented Apr. 24, 1934

1,956,088

UNITED STATES PATENT OFFICE 1,956,088

PROCESS FOR PREPARING DEHYDROGENATION PRODUCTS OF ALCOHOLS BY CATALYTIC DEHYDROGENATION

Adrianus Johannes van Peski and Hermanus Frans Joseph Lorang, Amsterdam, Netherlands, assignors to Naamlooze Vennootschap De Bataafsche Petroleum Maatschappij, The Hague, Netherlands No Drawing. Application June 8, 1931, Serial No. 543,012. In the Netherlands June 14, 1930

9 Claims. (Cl. 260—134)

Our invention relates to a process for preparing dehydrogenation products of alcohols by catalytic dehydrogenation.

The catalytic dehydrogenation of alcohols, which in order to obtain a suitable reaction velocity has to take place at elevated temperature, has already been known a long time.

Various metals, such as copper, iron, nickel and also metal oxides, have been proposed as catalysts. The said materials, however, have the drawback that their action is not purely specific; thus, for instance, according to the catalyst used, a more or less marked formation of olefines and polymers thereof always take place in addition to the dehydrogenation reaction, in consequence of the simultaneous dehydrating action of the catalyst on the alcohol.

It has been tried to avoid the formation of these undesirable by-products by using catalysts obtained from alkaline compounds insoluble in water, such as dolomite, magnesium-oxide, zinc-oxide and calcium carbonate, upon which the catalyst metal is caused to precipitate. It has also been proposed to add small quantities of alkaline compounds as promotor to the dehydrogenation catalyst.

Now it has been found that the catalytic dehydrogenation of alcohols is effected practically entirely without formation of olefines or their polymers if the reaction is carried out in the presence of a catalyst consisting of a catalytically acting metal or metal oxide on a water-soluble alkaline compound as carrier.

In addition to the aforesaid avoidance of undesirable secondary reactions, the process according to our invention has the advantage of the above-described catalytic mass having a much longer life than the contact masses hitherto known.

Moreover the hydrogen formed in the process according to our invention by the dehydrogenation of alcohols appeared to be very pure, so that it can be used directly for all purposes for which pure hydrogen is required.

The temperature at which the dehydrogenation is carried out may vary between wide limits. Very favourable results were obtained at temperatures of 250–400° C. The reaction can be carried out at elevated and, if desired, also at reduced pressure. In many cases, however, very good results were also obtained under atmospheric pressure.

*Examples of working*

1. Sodium carbonate was stirred with water to a thick slurry, then dried in a drying-oven at about 200° C. and subsequently granulated, the pieces of about 5 mm. diameter being used as carrier. 20 grams CuO (calculated on dry weight in view of the material containing a little water) was stirred with isopropyl-alcohol, to which was added 250 cc. carrier, whereupon the mass was inspissated while stirring.

Now upon isopropylalcohol vapour being passed over this catalyst at a velocity of 10 grams per hour at a reaction temperature of 275° C., the acetone content of the condensed reaction product after 1400 hours was still 74.7%, whilst the gas developed at this moment still contained 99.8% hydrogen. After 2019 hours the acetone-content of the condensate was still 72.6%, the hydrogen content of the gas being 99.0%.

2. 250 cc. technical sodium oxide waterglass solution (34° Bé) was inspissated with 5 grams CuO, dried and granulated. Isopropylalcohol vapour was passed over this mass at 300° C. with the same velocity as in Example 1. After 336 hours the acetone-content of the condensate was 79.3%, the hydrogen-content of the gas being 99.6%.

3. 300 grams potassium carbonate was moistened and dried. The potassium cake was granulated to pieces of about 5 mm. 20 grams CuO was stirred with acetone and brought onto the carrier by inspissation.

Upon isopropylalcohol being passed over this mass at 275° C. the acetone-content of the condensate after 300 hours was about 90%, the hydrogen-content of the gas being 99.4%. After 788 hours the acetone-content of the condensate was 74.4%, the hydrogen-content of the gas being 99.9%.

In addition to isopropylalcohol also other alcohols, for example secondary butyl alcohol, can be dehydrogenized according to the invention, methylethylketone and pure hydrogen then being obtained. Also the higher alcohols, such as those obtained as by-products by the methanol synthesis, can be advantageously dehydrogenized in the manner described.

It goes without saying, however, that the process is by no means restricted to the alcohols mentioned, but that also other alcohols can be converted into valuable dehydrogenation products with the aid of the catalytic mass composed in the manner described. Of course the process may likewise be carried out in the presence or absence of an oxidizing or an indifferent gas as those skilled in the art will readily understand.

What we claim is:

1. The process for the manufacture of dehydrogenation products of alcohols by catalytic dehydrogenation at an elevated temperature that improvement which comprises incorporating a dehydrogenating catalyst on a carrier composed substantially wholly of a water-soluble compound of an alkali metal which is substantially free from water-insoluble compounds.

2. The process for the manufacture of dehydrogenation products of alcohols by catalytic dehydrogenation at an elevated temperature that improvement which comprises incorporating a dehydrogenating catalyst on a carrier composed substantially wholly of a water-soluble oxygen-bearing compound of an alkali metal which is substantially free from water-insoluble compounds.

3. The process for the manufacture of dehydrogenation products of aliphatic alcohols by catalytic dehydrogenation at an elevated temperature which comprises establishing a dehydrogenating catalyst on a carrier composed substantially wholly of a water-soluble compound of an alkali metal which is substantially free from water-insoluble compounds and passing an aliphatic alcohol vapor in contact with said catalyst whereby dehydrogenation products and substantially pure hydrogen are produced.

4. The process for the manufacture of dehydrogenation products of aliphatic alcohols by catalytic dehydrogenation at an elevated temperature which comprises establishing a dehydrogenating catalyst containing copper supported on a carrier composed substantially wholly of a water soluble oxygen-bearing compound of an alkali metal which is substantially free from insoluble compounds and passing an aliphatic alcohol vapor in contact with said catalyst at an elevated temperature whereby dehydogenation products and substantially pure hydrogen are produced.

5. The process set forth in claim 4 in which isopropylalcohol vapor is passed in contact with the catalyst at an elevated temperature to produce acetone and hydrogen, said hydrogen having a purity of about 99%.

6. The process set forth in claim 4 in which a temperature of about 250° C. to about 400° C. is employed as the elevated temperature.

7. A process according to claim 1, wherein the dehydrogenation is carried out in the presence of an oxidizing gas containing oxygen.

8. A process according to claim 1, wherein the dehydrogenation is carried out in the presence of an indifferent gas.

9. A process according to claim 1, wherein the dehydrogenating catalyst consists of copper oxide on a compound of the group consisting of potassium carbonate, sodium carbonate and sodium water-glass as carrier.

ADRIANUS JOHANNES van PESKI.
HERMANUS FRANS JOSEPH LORANG.